US008019696B2

(12) United States Patent
Harris et al.

(10) Patent No.: US 8,019,696 B2
(45) Date of Patent: Sep. 13, 2011

(54) METHOD AND SYSTEM TO PROTECT AND TRACK DATA FROM MULTIPLE METERS ON A REMOVABLE STORAGE MEDIUM

(75) Inventors: Mark N. Harris, New Haven, CT (US); Craig J. DeFilippo, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 2588 days.

(21) Appl. No.: 10/744,662

(22) Filed: Dec. 23, 2003

(65) Prior Publication Data

US 2005/0137988 A1 Jun. 23, 2005

(51) Int. Cl.
*G06F 17/00* (2006.01)
(52) U.S. Cl. ........................................................ 705/401
(58) Field of Classification Search ................ 364/464.2
See application file for complete search history.

(56) References Cited

U.S. PATENT DOCUMENTS 4,328,564 A * 5/1982 Pryor ............................ 365/130
4,328,567 A * 5/1982 Dodge ............................ 367/32
5,649,408 A * 7/1997 Mazeiller ........................ 53/460
5,655,024 A 8/1997 Bell et al.
5,666,292 A 9/1997 Hunter et al.
5,680,403 A 10/1997 Riello et al.
5,696,829 A 12/1997 Cordery et al.
5,731,980 A * 3/1998 Dolan et al. .................. 705/410
5,737,426 A 4/1998 Brookner et al.
5,809,485 A * 9/1998 Arsenault et al. ............. 705/410
5,898,785 A 4/1999 Cornell et al.
6,085,180 A * 7/2000 Beer et al. ...................... 705/401
6,226,559 B1 5/2001 Felmus et al.
6,502,240 B1 12/2002 Naclerio
6,889,214 B1 * 5/2005 Pagel et al. ................... 705/410
7,047,221 B1 * 5/2006 Hetzer et al. .................... 705/50
2002/0013773 A1 * 1/2002 Reisinger ........................ 705/60
2003/0204477 A1 * 10/2003 McNett .......................... 705/406
2005/0256811 A1 * 11/2005 Pagel et al. ................... 705/401

OTHER PUBLICATIONS

"alt.cw.(The Back Page) (News Briefs)", Computerworld, v31, n45, p. 114.*

* cited by examiner

*Primary Examiner* — Rutao Wu
(74) *Attorney, Agent, or Firm* — Brian A. Lemm; Charles R. Malandra, Jr.; Steven J. Shapiro

(57) ABSTRACT

A system and method for allowing multiple postage meters to utilize removable storage media to accurately track and protect data generated during use is provided. A unique identifier is provided for each removable storage medium, and the removable storage medium is associated with a single meter. A catalog of additional meters authorized for use with the storage medium is maintained on each medium. When the storage medium is attached to a meter, the meter determines if the storage medium has been authorized for use with the meter or, if allowable, establishes a new entry in the catalog for the meter. Thus, data for a plurality of meters can be maintained on the same storage medium. Any discrepancies that exist between the data stored in the meter and the storage medium can be reconciled by the user, thereby allowing accurate maintenance of the data.

31 Claims, 4 Drawing Sheets

METHOD AND SYSTEM TO PROTECT AND TRACK DATA FROM MULTIPLE METERS ON A REMOVABLE STORAGE MEDIUM

FIELD OF THE INVENTION

The invention disclosed herein relates generally to mailing systems, and more particularly to a mailing system that utilizes a removable storage medium to store data.

BACKGROUND OF THE INVENTION

Mailing systems, such as, for example, a mailing machine, often include different modules that automate the processes of producing articles, such as, for example, mail pieces. Mail pieces can include, for example, envelopes, post cards, flats, and the like. The typical mailing machine includes a variety of different modules or sub-systems each of which performs a different task on the mail piece. The mail piece is conveyed downstream utilizing a transport mechanism, such as rollers or a belt, to each of the modules. Such modules could include, for example, a separating module, i.e., separating a stack of mail pieces such that the mail pieces are conveyed one at a time along the transport path, a moistening/sealing module, i.e., wetting and closing the glued flap of an envelope, a weighing module, and a metering/printing module, i.e., applying evidence of postage to the mail piece. The exact configuration of the mailing machine is, of course, particular to the needs of the user.

A control panel device, hereinafter referred to as a User Interface Controller (UIC), performs user interface and controller functions for the mailing machine. Specifically, the UIC provides all user interfaces, executes control of the mailing machine and print operations, calculates postage for debit based upon rate tables, provides the conduit for a Postal Security Device (PSD) to transfer postage indicia to the printer, operates with peripherals for accounting, printing and weighing, and conducts communications with a data center for postage funds refill, software download, rates download, and market-oriented data capture. The UIC, in conjunction with an embedded PSD, constitutes the system meter that satisfies U.S. information-based indicia postage (IBIP) meter requirements and other international postal regulations regarding closed system meters.

It is generally desirable to provide a single UIC platform for all customers, thereby eliminating the need to manufacture and maintain multiple versions of the UIC. The UIC may be provided with one or more input/output ports, such as, for example, a USB port, through which peripheral devices can be attached as required. For example, some customers may desire to have enhanced accounting capability to track the usage of postage generated by the UIC. Such enhanced accounting capability requires additional storage, e.g., memory, for the accounting data generated by the UIC. To prevent additional, unused memory from being provided in every UIC, thereby increasing the cost of the UIC, additional memory is provided to only those customers that desire the additional enhanced accounting capability through a USB port on the UIC.

There are problems, however, when the additional memory is external to the UIC. For example, if the UIC fails for some reason and must be replaced, it is still desirable to maintain any accounting data related to the failed UIC and provide a coherent accounting picture for both the old UIC and the new UIC. Thus, provisions must be made within the additional memory to track and protect data from more than one UIC. Additionally, the UIC could be operated without the additional memory attached, thereby resulting in discrepancies between the actual usage of the UIC to provide postage and the accounting data as stored in the additional memory. In addition, the risk of a power failure during update of the data stored in the external memory can result in discrepancies between the actual usage of the UIC and the accounting data as stored in the additional external memory. The external memory can also be utilized for data other than accounting data, which could also be subject to the same problems as specified above.

Thus, there exists a need for a system and method to protect and track data from multiple postage meters on an external memory.

SUMMARY OF THE INVENTION

The present invention alleviates the problems associated with the prior art and provides a system and method for allowing multiple postage meters to utilize removable storage media to accurately track and protect data generated during use.

In accordance with the present invention, a unique identifier is provided for each removable storage medium, and the removable storage medium is associated with a single meter. A catalog of additional meters authorized for use with the storage medium is maintained on each medium. When the storage medium is attached to a meter, the meter determines if the storage medium has been authorized for use with the meter or, if allowable, establishes a new entry in the catalog for the meter. Thus, data for a plurality of meters can be maintained on the same storage medium. Any discrepancies that exist between the data stored in the meter and the storage medium can be reconciled by the user, thereby allowing accurate maintenance of the data.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
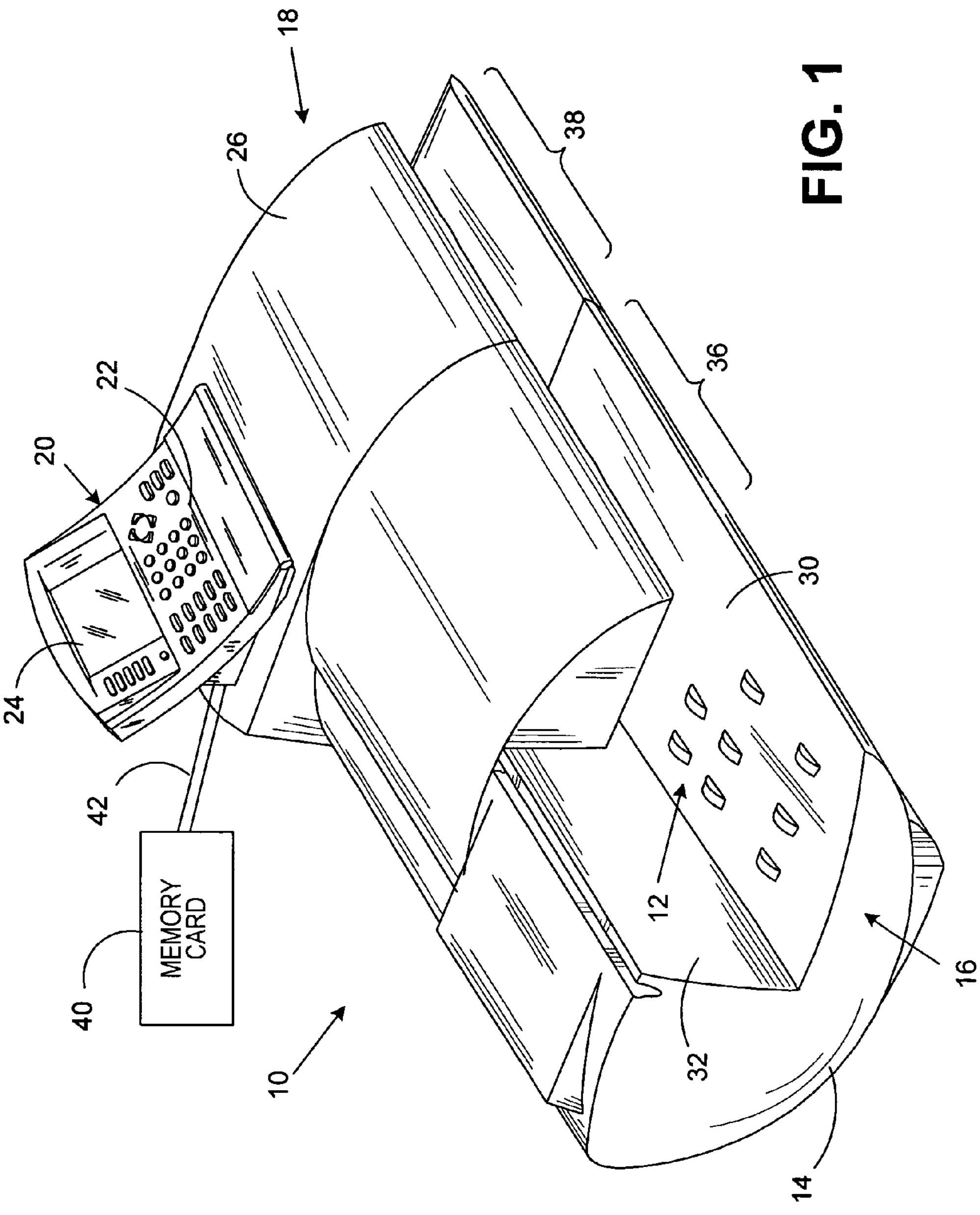
FIG. 1 illustrates a mailing machine with an external storage medium that operate according to an embodiment of the present invention.

In describing the present invention, reference is made to the drawings, wherein there is seen in FIG. 1 a mailing machine 10, including an external storage medium 40, that operate according to an embodiment of the present invention. Mailing machine 10 comprises a base unit, designated generally by the reference numeral 14, the base unit 14 having a mail piece input end, designated generally by the reference numeral 16, and a mail piece output end, designated generally by the reference numeral 18. A control panel device 20, also referred to as the UIC 20, is mounted on the base unit 14, and includes one or more input/output devices, such as, for example, a keyboard 22 and a display device 24. UIC 20 is preferably, implemented utilizing one or more special or general purpose processors that execute associated software stored in non-volatile memory.

Mailing machine 10 further includes one or more cover members 26 that are pivotally mounted on the base 14 so as to move from the closed position shown in FIG. 1 to an open position (not shown) to expose various operating components and parts for service and/or repair as needed. The base unit 14 further includes a horizontal feed deck 30 which extends substantially from the input end 16 to the output end 18. A plurality of nudger rollers 12 can be suitably mounted under the feed deck 30 to project upwardly through openings in the feed deck so that the periphery of the rollers 12 is slightly above the upper surface of the feed deck 30 and can exert a forward feeding force on a succession of mail pieces placed in the input end 16. A registration wall 32 defines a mail piece registration surface substantially perpendicular to the feed deck 30 that extends substantially from the input end 16 to the output end 18. Mail pieces placed in the input end 16 are fed by the nudger rollers 12 along the feed deck 30, with the top edge of the mail piece being registered against the wall 32. The mail pieces may be passed through one or more modules, such as, for example, a singulator module and a moistening module. Each of these modules is located generally in the area indicated by reference numeral 36. The mail pieces are then passed to a metering/printing module located generally in the area indicated by reference numeral 38.

The UIC 20 provides all user interfaces, executes control of the mailing machine 10 and print operations, calculates postage for debit based upon rate tables, provides the conduit for an embedded Postal Security Device (PSD) to transfer postage indicia to a printer within the mailing machine 10, operates with peripherals for accounting, printing and weighing, and conducts communications with a data center for postage funds refill, software download, rates download, and market-oriented data capture. The UIC 20, in conjunction with the embedded PSD, constitutes the system meter that satisfies U.S. information-based indicia postage (IBIP) meter requirements and other international postal regulations regarding closed system meters. The UIC 20 is typically provided with a fixed amount of data storage capability in the form of memory sufficient to operate the UIC 20 during standard operating modes. For those customers that wish to utilize enhanced capabilities of the UIC 20 that requires more memory capacity than the UIC 20 is provided with, additional external memory capacity can be provided. For example, with enhanced accounting capabilities, additional data with respect to each transaction performed by the UIC 20 can be stored. The additional data can include, for example, information with respect to batch mail processing, including the class of mail, carrier, account number for internal accounting purposes, number of pieces in the batch, weight of each piece, as well as summary records for each batch that can be utilized by the customer. Since the UIC 20 is not provided with memory sufficient to store all of the desired additional data, additional memory capacity can be implemented, for example, as a memory card 40 coupled to the UIC 20. Memory card 40 could be, for example, implemented as a flash memory. The memory card 40 can be coupled to the UIC 20 via a data bus 42 as illustrated, or could also be coupled to the UIC 20 via an integral card reader in the UIC 20 that has a slot for the insertion of memory card 40. The data bus 42 can be coupled to the UIC 20 via a USB port on the UIC 20. Alternatively, the memory card 40 could be coupled to the UIC 20 through a USB port on the base 14. Thus, any data generated by the UIC 20 can be passed to the memory card 40 for storage. Additionally, the UIC 20 can access the memory card 40 to retrieve stored data. Such retrieval could be, for example, to allow the UIC 20 to prepare reports for display or printing.

Because the memory card 40 is removable from the UIC 20, it can be utilized with meters other than UIC 20. For example, if the UIC 20 fails for some reason and must be replaced by a new UIC, it is still desirable to maintain the data from the failed UIC 20 along with the new UIC. As such, the memory card 40 must be able to track and protect data from multiple meters. In addition, the UIC 20 can be operated without the memory card 40 attached. There is also the risk of interruption of updates to data stored on the memory card 40, thereby rendering such update incomplete, such as, for example, if the power to the UIC 20 is removed before the update has been completed. Each of these situations can lead to discrepancies between the data stored on the memory card 40 and the actual usage of the UIC 20. It is important to ensure the accuracy of the data stored in the memory card 40, since reports prepared by the UIC 20 may be based on the data stored in the memory card 40. Thus, if the data stored in the memory card 40 is inaccurate, it will not be possible to generate accurate reports, leading to customer dissatisfaction.

Figure 2:
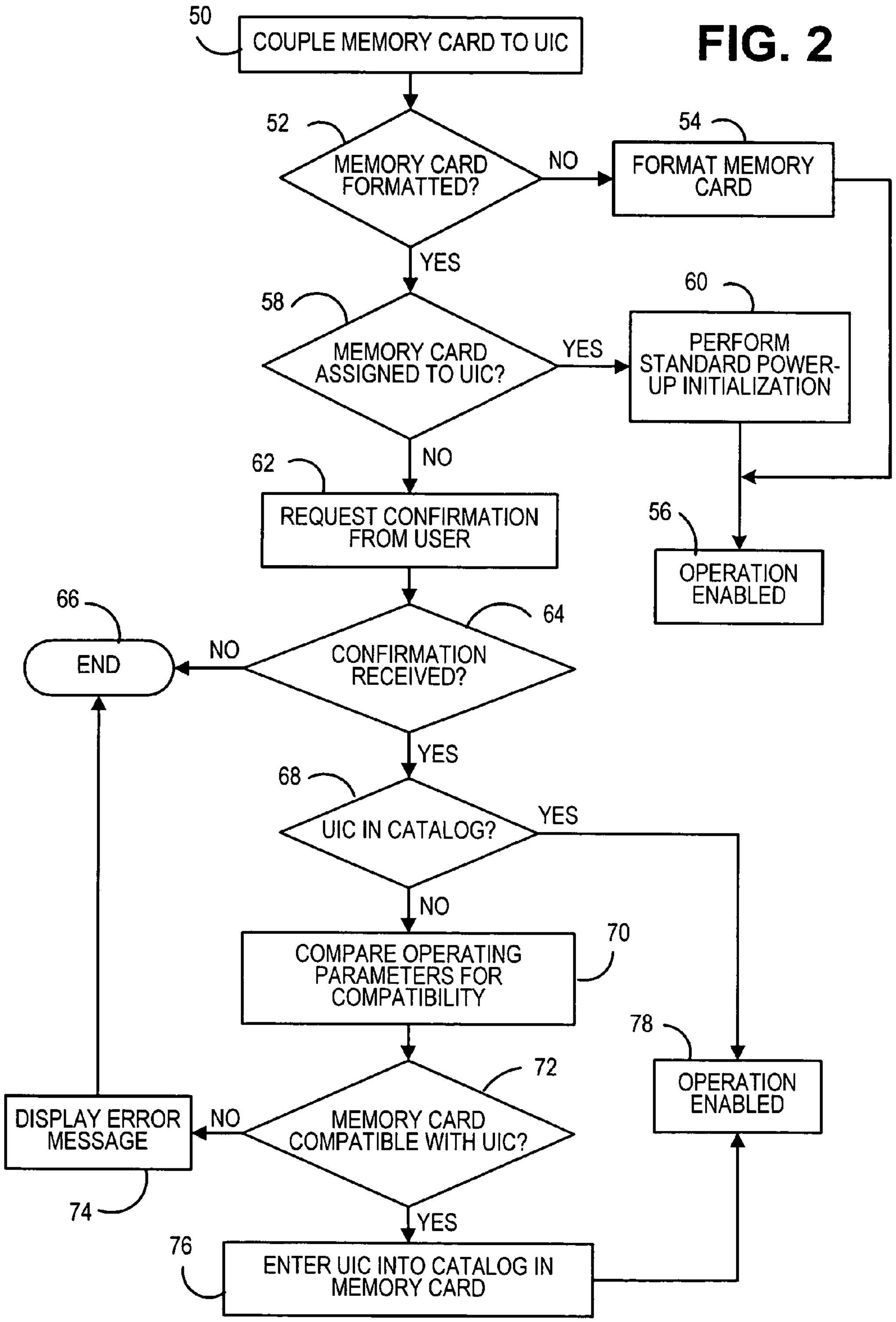
FIG. 2 illustrates in flow chart form an example of the processing performed by the mailing machine as illustrated in FIG. 1.

The present invention solves the problems created when an external removable medium, such as memory card 40, is used to store data generated by the UIC 20. Referring now to FIG. 2, there is illustrated in flow chart form the processing performed by the UIC 20 when a memory card 40 is coupled to the UIC 20. In step 50, a memory card 40 is coupled to the UIC 20 by any suitable manner. In step 52, the UIC 20 determines if the memory card 40 has already been formatted for use. The memory card 40 may not be formatted if the memory card 40 is being used for the first time, or if the memory card 40, while having been previously used, has been completely erased and requires reformatting. The determination performed in step 52 can be based on whether or not the memory card 40 has been assigned a serial number, which will be stored in the memory card 40. If the memory card 40 does not have a serial number stored therein, then the UIC 20 determines the memory card 40 is not formatted and proceeds to step 54 to format the memory card 40 as described further below with respect to FIG. 3. Once the memory card 40 has been formatted in step 54, then the memory card 40 is ready for use with the UIC 20 and the mailing system 10 is enabled for operation utilizing the enhanced capabilities that require the memory card 40 in step 56.

If in step 52, it is determined that the memory card 40 is already formatted, e.g., it has a stored serial number therein, then in step 58 the UIC 20 determines if the memory card 40 is assigned to the UIC 20. This is performed by comparing the serial number stored in the memory card 40 with the serial number of the UIC 20. As described below with respect to FIG. 3, when a memory card is formatted, a unique identifier, based on the serial number of the UIC that is performing the formatting, is stored in the memory card as a serial number for the memory card. The memory card is thus assigned for use with the UIC that performed the formatting. Thus, in step 58 the UIC 20 will determine if the serial number for the memory card 40 is based on the serial number of the UIC 20, thereby indicating that the memory card 40 is assigned to the UIC 20. If in step 58 it is determined that the memory card 40 is assigned to the UIC 20, then the processing proceeds to step 60 to perform a standard power-up initialization of the memory card 40 as described further below with respect to FIG. 4. Once the power-up initialization has been performed in step 60, the memory card 40 is ready for use with the UIC 20 and the mailing system 10 is enabled for operation utilizing the enhanced capabilities that require the memory card 40 in step 56. It should be noted that since the memory card 40 was either formatted by the UIC 20 or already assigned to the UIC 20 when the processing reaches step 56, operational parameters of the memory card 40, as described below, can be changed during the operation of the mailing machine 10. Thus, to make changes to the one or more parameters of the memory card 40, it may be necessary to have the memory card 40 coupled to the UIC with which it is assigned.

If in step 58 it is determined that the memory card 40 is not assigned to the UIC 20, i.e., the memory card 40 was originally formatted by and assigned to a different UIC, then in step 62 the UIC 20 will display a message to the user indicating that the memory card 40 is not assigned to the UIC 20 and confirmation will be requested from the user that the user desires to use the memory card 40 with the UIC 20. In step 64 it is determined if confirmation to proceed has been received from the user. Such confirmation could be provided, for example, from the keyboard 22 of the UIC 20. In some embodiments, confirmation can only be provided by a service technician, thereby preventing a user from authorizing use of the memory card 40 with the UIC 20. If the user does not wish to use, or cannot authorize use of, the memory card 40 with the UIC 20, then in step 66 the processing will end, the memory card 40 will not be enabled for use with the UIC 20, and the user will be unable to perform the enhanced activities that require the additional memory capacity of the memory card 40. The user can then attach a different memory card and the processing can be repeated for the different memory card. It should be noted that steps 62 and 64 are optional, and need not be performed, and the processing can proceed from step 58 directly to step 68. If the user does wish to proceed, i.e., confirmation is received in step 64, or if steps 62 and 64 are not performed, then in step 68 the UIC 20 can determine if the UIC 20 already has allocated space for use in the memory card 40. The memory card 40 maintains a catalog of UICs with which it has previously been used to store data. Thus, while the memory card 40 may be assigned to a particular UIC, the memory card 40 can still be used with more than one UIC. If the UIC 20 is already in the catalog maintained by the memory card 40, i.e., the memory card 40 has been previously been used to stored data generated by the UIC 20, then the memory card 40 is ready for use with the UIC 20 and the mailing system 10 is enabled for operation utilizing the enhanced capabilities that require the memory card 40 in step 78. It should be noted that step 68 may be optional, and the processing can pass from step 64 (or step 58 if steps 62 and 64 are not performed) directly to step 70.

If in step 68 it is determined that the UIC 20 is not in the catalog maintained by the memory card 40, or if step 68 is not performed, then in step 70 the UIC 20 will compare one or more operational parameters of the UIC 20 with that as specified for the memory card 40 to determine if they are compatible for use with each other. For example, when the memory card 40 was first formatted, several operational parameters were established for the memory card 40. One such parameter includes set-up data including, for example, the enhanced accounting capabilities with which the memory card 40 can be used. For example, the memory card 40 may be formatted for a certain number of accounts, such as, for example, one thousand different accounts, for internal accounting purposes. The UIC 20 is configured to provide only those services paid for by the user, and may be configured for use with a different number of accounts then the memory card 40. For example, the UIC 20 may be configured for only three hundred different accounts. In the situation in which the UIC 20 is configured for use with less accounts than for which the memory card 40 has been formatted, the memory card 40 will not be compatible with the UIC 20 as it may allow the user to utilize features for which payment has not been made, e.g., additional accounts. As another example, when the memory card 40 was formatted, parameters for global account data were specified for the memory card 40. The global account data parameters include, for example, the monetary unit and the weight unit that will be used. The monetary unit could be, for example, dollars, pounds, francs, etc. The weight unit could be an avoirdupois system or metric system. To be compatible, the memory card 40 and the UIC 20 must both be configured to utilize the same units.

If in step 72 it is determined that the memory card 40 is not compatible for use with the UIC 20, due to one or more different operational parameters, then in step 74 a message will be displayed to the user indicating that the memory card 40 can not be used with the UIC 20. In step 66 the processing will end, the memory card 40 will not be enabled for use with the UIC 20, and the user will be unable to perform the enhanced activities that require the additional memory capacity of the memory card 40. If in step 72 it is determined that the memory card 40 is compatible for use with the UIC 20, then in step 76 a new entry will be made in the catalog maintained by the memory card 40 for the UIC 20, and a location in the memory card 40 will be configured to store data generated by the UIC 20. The location in the memory card 40 for the UIC 20 can be identified, for example, by the serial number of the UIC 20. Thus, every UIC with which the memory card 40 has been enabled for use will have a different location within the memory card 40 assigned to it and identified by the serial number of each UIC. Note, however, that the unique identifier of the memory card 40 will not change. The entry of the UIC 20 into the catalog of the memory card 40 in step 76 need not be automatic. In some embodiments, it may require approval by the user, and may also require a user password, thereby allowing only supervisors or the like to allow the memory card 40 to be used with the UIC 20. Once the UIC 20 has been entered into the catalog of the memory card 40, the memory card 40 is ready for use with the UIC 20 and the mailing system 10 is enabled for operation utilizing the enhanced capabilities that require the memory card 40 in step 78. It should be noted that the enabling of operation in step 78 may or may not be identical to enabling the operation in step 56. For example, in step 78, the memory card 40 was formatted and assigned to a different UIC other than UIC 20. Thus, according to some embodiments, it is preferable that the UIC 20 not be authorized to make any changes to the operational parameters of the memory card 40. To make changes to the operational parameters of the memory card 40, it may be required to have the memory card 40 coupled to the UIC with which it is assigned. Alternatively, of course, the UIC 20 could be authorized to make changes to the operational parameters of the memory card 40 if desired, even though the memory card 40 is not assigned to the UIC 20. In addition, if the memory card 40 is not assigned to the UIC 20, then UIC 20 will preferably store the serial number of the memory card in non-volatile memory for use in a power recovery mode as described further below.

Figure 3:
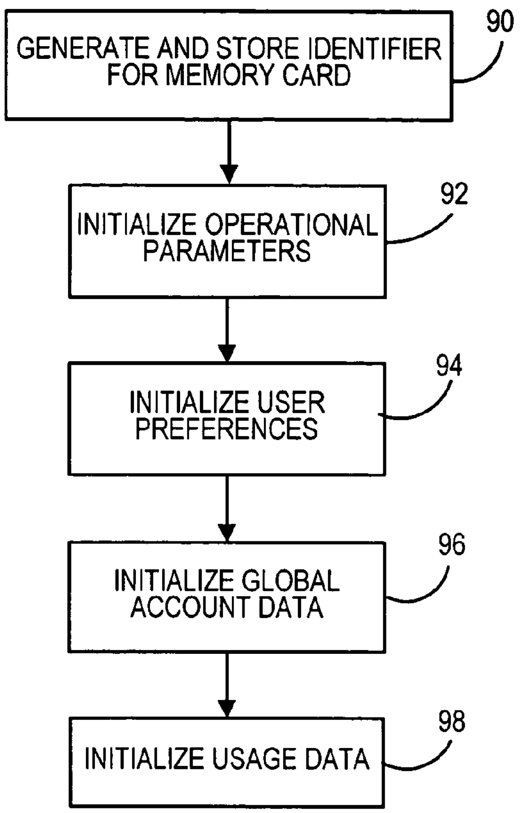
FIG. 3 illustrates in flow chart form an example of formatting of an external storage medium.

Referring now to FIG. 3, there is illustrated in flow chart form an example of the processing performed during formatting of memory card 40 as specified in step 54 of FIG. 2 according to an embodiment of the invention. In step 90, a unique identifier for the memory card 40 is generated by the UIC 20 and stored in the memory card 40. The unique identifier provides a serial number for the memory card 40. The unique identifier is preferably based on the serial number of the UIC 20. For example, the unique identifier could include the serial number of the UIC 20 with an appended prefix, an appended suffix, or both. In some embodiments, the generation of the unique identifier need not occur until before the usage data is initialized as described below with respect to step 98. In step 92, set-up parameters of the memory card 40 are initialized, based on the set-up parameters from the UIC 20. The set-up parameters include those features the user has purchased and for which the UIC 20 is enabled. For example, the user may have purchased enhanced accounting capabilities to maintain three thousand additional accounts for departmental accounting. The memory card 40 will then be initialized to accommodate the three thousand accounts.

In step 94 the memory card 40 is initialized with user preferences based on user preferences from the UIC 20. Such user preferences could include, for example, the use of passwords to access accounts, the amount of any budgets for each account set by the user, etc. In step 96, the memory card 40 is initialized with the global account data parameters from the UIC 20. As previously described, the global account data parameters include, for example, the monetary unit and the weight unit that will be used. In step 98, the memory card 40 is initialized with current usage data from the UIC 20. The usage data is stored in a location associated with the serial number of the UIC 20, thereby allowing the memory card 40 to store data for more than one UIC. The usage data can include, for example, the ascending register value of the UIC 20, i.e., the total amount of funds expended by the UIC 20 to date, the total number of pieces that have been processed by the UIC 20 to date, the total amount of postage expended by the UIC 20 to date, and the total amount of any surcharges expended by the UIC 20 to date.

Thus, the memory card 40 will be formatted by the UIC 20 and initialized to the same operational parameters, including user preferences, global account data, and current usage data, as the UIC 20. Additional memory space is allocated for the UIC 20 to store additional data related to transactions processed by the UIC 20. The memory card 40 is then ready for use with the UIC 20 and the mailing system 10 will be enabled for operation utilizing the enhanced capabilities that require the memory card 40 (step 56 of FIG. 1).

Figure 4:
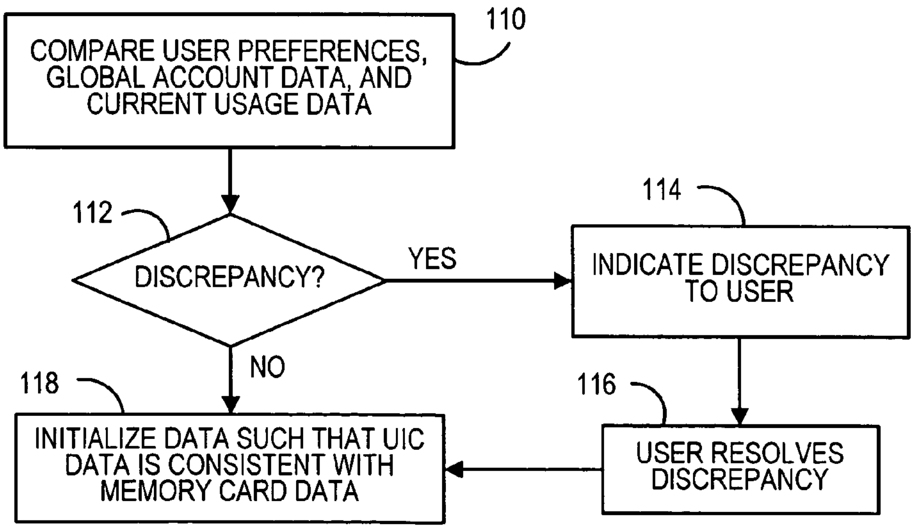
FIG. 4 illustrates in flow chart form an example of standard power-up initialization performed by the mailing machine and external storage medium.

Referring now to FIG. 4, there is illustrated in flow chart from the processing performed during standard power-up initialization of memory card 40 as specified in step 60 of FIG. 2. In step 110, the data associated with one or more operational parameters, including, for example, the user preferences, global account data, and current usage data as stored in the UIC 20, is compared to the data as stored in the memory card 40. In step 112, it is determined if there is a discrepancy between the data, i.e., if the data does not match. For example, if the UIC 20 was used to process mail pieces and dispense postage when the memory card 40 was not attached, the usage data will not coincide. The UIC 20 may have a higher ascending register value, piece count, total postage value, and possibly total surcharge value than the memory card 40. If the memory card 40 was used with a different UIC that was enabled to change the operational parameters, such as, for example, the set-up data or global account data, and some of the parameters were changed, there can be a discrepancy between the memory card 40 and the UIC 20. If a discrepancy exists, then in step 114 the discrepancy is indicated to the user, utilizing, for example, the display 24 of the UIC 20, and in step 116 the user can resolve the discrepancy. For example, if the UIC 20 expended postage while the memory card 40 was not attached, the user will be asked to reconcile the additional postage with an account number, thereby allowing the additional postage to be properly accounted for. If there are no discrepancies found in step 112, or if the user has resolved the discrepancies or does not desire to resolve one or more discrepancies, then in step 118 the stored data is initialized such that the data stored in the UIC 20 is consistent with the data stored in the memory card 40. Preferably, the data stored in the UIC 20 is updated to be consistent with the data stored in the memory card 40, thereby allowing the memory card 40 to maintain a consistent running total. Thus, the UIC 20 and memory card 40 will be initialized to the same operational parameters, including user preferences and current usage data. The memory card 40 is then ready for use with the UIC 20 and the mailing system 10 will be enabled for operation utilizing the enhanced capabilities that require the memory card 40 (step 56 of FIG. 1).

Figure 5:
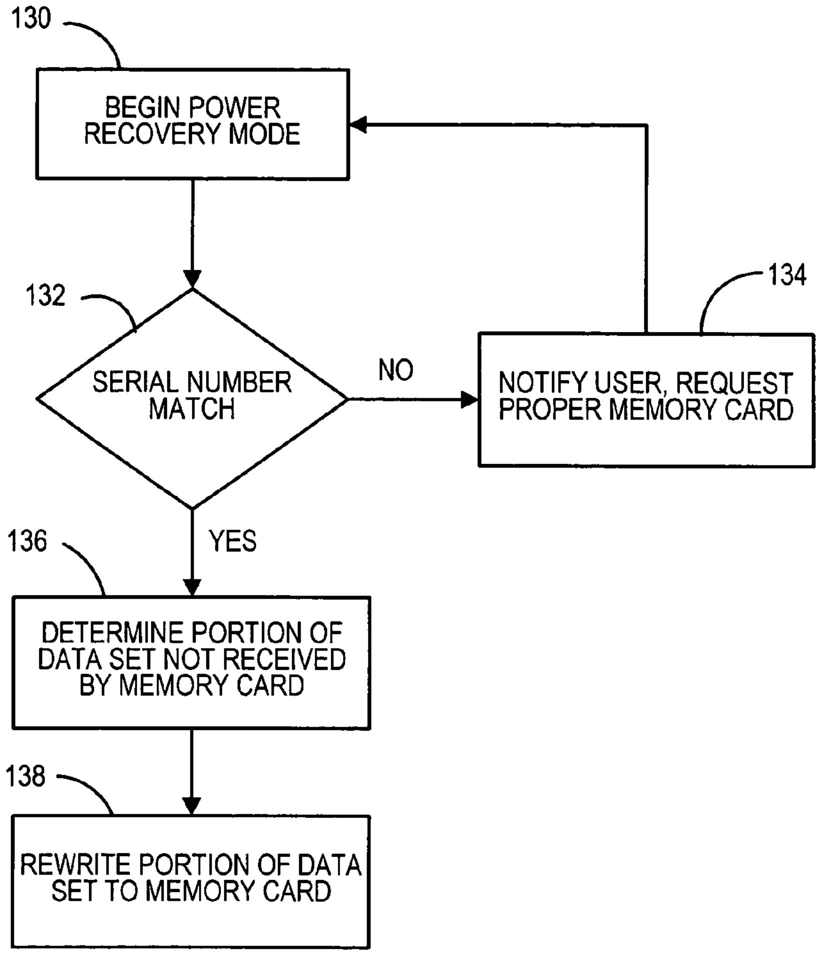
FIG. 5 illustrates in flow chart form an example of the processing performed during a power recovery operation.

Referring now to FIG. 5, there is illustrated in flow chart form an example of the processing performed during a power recovery operation by the mailing machine 10. Preferably, when data is written from the UIC 20 to the memory card 40, it is staged until confirmed. Staging includes temporarily storing the data in the UIC 20 until the user has indicated that the processing for a mailing has been completed. For example, when the mailing machine 10 is processing a batch of mail, the data associated with the batch of mail will be temporarily stored in non-volatile memory of the UIC 20 until the user indicates the batch has been completed. In addition, as previously noted, the serial number of the memory card 40 currently being used with the UIC 20 is preferably stored in non-volatile memory of the UIC 20. The data for the complete batch of mail will then be sent to the memory card 40 for storage. If for some reason the transmission of the data for the batch is interrupted before being completed, such as, for example, if the power is removed from the mailing machine 10, the data stored in the memory card 40 will be incomplete. Upon return of the power to the mailing machine 10, the UIC 20 will determine that the memory card 40 was not properly updated and enter a recovery process as illustrated in FIG. 5.

In step 130, the UIC 20 beings a power recovery mode. In step 132, the UIC 20 determines if the serial number of the memory card 40 currently coupled to the UIC 20 matches the serial number of the memory card, stored in the memory of the UIC 20, that was coupled to the UIC 20 before the power was interrupted. Thus, if the user has switched memory cards, the serial number will not match and in step 134 the user will be notified that the memory card is different than the one attached before the power interruption. A request will be made to install the proper memory card 40 and the processing will begin again in step 130. Once the serial numbers match, indicating that the same memory card 40 is coupled to the UIC 20, then in step 136 the UIC 20 will determine the portion of the data set that was not received and stored by the memory card 40 before the power was interrupted. Preferably, markers are inserted into the data such that it can be determined from the markers which portions of the data have already been stored in the memory card 40. Thus, by examining the markers within the data, the UIC 20 can determine which portions of the data have and have not been successfully stored in the memory card 40. In step 138, those portions found not to have been written to the memory card 40 in step 136 are rewritten to the memory card 40, thereby providing a complete data download for the batch of mail. Thus, the UIC 20 will proceed with the power fail recovery only when the proper memory card 40 is attached, thereby ensuring the accuracy and proper tracking of data.

Thus, according to the present invention, a system and method for allowing multiple postage meters to utilize removable storage media to accurately track and protect data generated during use is provided. While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for operating a postage meter and a removable storage medium for storing data coupled to the postage meter, the method comprising:

determining if the storage medium is assigned to the postage meter;

if the storage medium is assigned to the postage meter, performing an initialization of the storage medium and the postage meter and using the storage medium to store data generated by the postage meter;

if the storage medium is not assigned to the postage meter, determining if operational parameters set for the storage medium are compatible with operational parameters set for the postage meter;

if the operational parameters set for the storage medium are not compatible with the operational parameters set for the postage meter, providing a signal indicating that the storage medium can not be used with the postage meter;

if the operational parameters of the storage medium are compatible with the operational parameters of the postage meter, entering the postage meter into a catalog of postage meters on the storage medium, allocating space on the storage medium to store data generated by the postage meter and using the storage medium to store data generated by the postage meter;

entering a power recovery mode after a power interruption;

determining if a serial number of the storage medium coupled to the postage meter after the power interruption matches a serial number of a storage medium coupled to the postage meter before the power interruption;

if the serial numbers match, determining if any portion of data intended to be written to the storage medium before the power interruption was not received by the storage medium; and rewriting any portion of data intended to be written to the storage medium that was not received by the storage medium.

2. The method of claim 1, wherein determining if the storage medium is assigned to the postage meter further comprises:

comparing a serial number of the storage medium with a serial number of the postage meter.

3. The method of claim 1, wherein performing an initialization of the storage medium with the postage meter further comprises:

comparing data for at least one operational parameter stored in the postage meter with data for a corresponding operational parameter stored in the storage medium;

determining if a discrepancy exists between the data stored in the postage meter and the data stored in the storage medium; and if a discrepancy exists, requesting a user to reconcile the discrepancy.

4. The method of claim 3, wherein the at least one operational parameter includes one of user preference data, global account data, and current usage data.

5. The method of claim 1, wherein determining if operational parameters set for the storage medium are compatible with operational parameters set for the postage meter further comprises:

comparing at least one operational parameter set for the postage meter with a corresponding operational parameter set for the storage medium.

6. The method of claim 5, wherein the at least one operational parameter includes set-up data.

7. The method of claim 5, wherein the at least one operational parameter includes user preference data.

8. The method of claim 5, wherein the at least one operational parameter includes global account data.

9. The method of claim 8, wherein the global account data includes monetary and weight units in which data will be stored.

10. The method of claim 1, wherein before entering the postage meter into a catalog of postage meters on the storage medium, the method further comprises:

determining if the postage meter is already entered in the catalog of postage meters.

11. The method of claim 1, wherein the storage medium is a flash memory.

12. The method of claim 1, wherein determining if the storage medium is assigned to the postage meter further comprises:

determining if the storage medium is formatted;

if the storage medium is not formatted, formatting the storage medium for use with the postage meter and using the storage medium to store data generated by the postage meter; and if the storage medium is formatted, determining if the storage medium is assigned to the postage meter.

13. The method of claim 12, wherein determining if the storage medium if formatted further comprises:

determining if the storage medium has been assigned a serial number.

14. The method of claim 12, wherein formatting the storage medium for use with the postage meter further comprises:

generating a unique identifier for the storage medium, storing the unique identifier in the storage medium; and initializing at least one operational parameter for the storage medium.

15. The method of claim 14, wherein the unique identifier is based on a serial number of the postage meter.

16. A mailing machine comprising:

a postage meter;

a removable storage medium coupled to the postage meter;

means for determining if the storage medium is assigned to the postage meter;

if the storage medium is assigned to the postage meter, means for performing an initialization of the storage medium and the postage meter and using the storage medium to store data generated by the postage meter;

if the storage medium is not assigned to the postage meter, means for determining if operational parameters set for the storage medium are compatible with operational parameters set for the postage meter;

if the operational parameters set for the storage medium are not compatible with the operational parameters set for the postage meter, means for providing a signal indicating that the storage medium can not be used with the postage meter; and if the operational parameters of the storage medium are compatible with the operational parameters of the postage meter, means for entering the postage meter into a catalog of postage meters on the storage medium, allocating space on the storage medium to store data generated by the postage meter and using the storage medium to store data generated by the postage meter.

17. The mailing machine of claim 16, wherein the means for determining if the storage medium is assigned to the postage meter further comprises:

means for comparing a serial number of the storage medium with a serial number of the postage meter.

18. The mailing machine of claim 16, wherein the means for performing an initialization of the storage medium with the postage meter further comprises:

means for comparing data for at least one operational parameter stored in the postage meter with data for a corresponding operational parameter stored in the storage medium;

means for determining if a discrepancy exists between the data stored in the postage meter and the data stored in the storage medium; and if a discrepancy exists, means for requesting a user to reconcile the discrepancy.

19. The mailing machine of claim 18, wherein the at least one operational parameter includes one of user preference data, global account data, and current usage data.

20. The mailing machine of claim 16, wherein the means for determining if operational parameters set for the storage medium are compatible with operational parameters set for the postage meter further comprises:

means for comparing at least one operational parameter set for the postage meter with a corresponding operational parameter set for the storage medium.

21. The mailing machine of claim 20, wherein the at least one operational parameter includes set-up data.

22. The mailing machine of claim 20, wherein the at least one operational parameter includes user preference data.

23. The mailing machine of claim 20, wherein the at least one operational parameter includes global account data.

24. The mailing machine of claim 23, wherein the global account data includes monetary and weight units in which data will be stored.

25. The mailing machine of claim 16, further comprising:

means for determining if the postage meter is already entered in the catalog of postage meters.

26. The mailing machine of claim 16, wherein the storage medium is a flash memory.

27. The mailing machine of claim 16, further comprising:

means for entering a power recovery mode after a power interruption;

means for determining if a serial number of the storage medium coupled to the postage meter after the power interruption matches a serial number of a storage medium coupled to the postage meter before the power interruption;

if the serial numbers match, means for determining if any portion of data intended to be written to the storage medium before the power interruption was not received by the storage medium; and means for rewriting any portion of data intended to be written to the storage medium that was not received by the storage medium.

28. The mailing machine of claim 16, further comprising:

means for determining if the storage medium is formatted; and if the storage medium is not formatted, means for formatting the storage medium for use with the postage meter and using the storage medium to store data generated by the postage meter.

29. The mailing machine of claim 28, wherein the means for determining if the storage medium if formatted further comprises:

means for determining if the storage medium has been assigned a serial number.

30. The mailing machine of claim 28, wherein the means for formatting the storage medium for use with the postage meter further comprises:

means for generating a unique identifier for the storage medium, means for storing the unique identifier in the storage medium; and means for initializing at least one operational parameter for the storage medium.

31. The mailing machine of claim 30, wherein the unique identifier is based on a serial number of the postage meter.

* * * * *